March 28, 1961  D. BECKWORTH  2,976,897
REUSABLE PRESSURIZED CANISTER
Filed Feb. 10, 1959  2 Sheets-Sheet 1
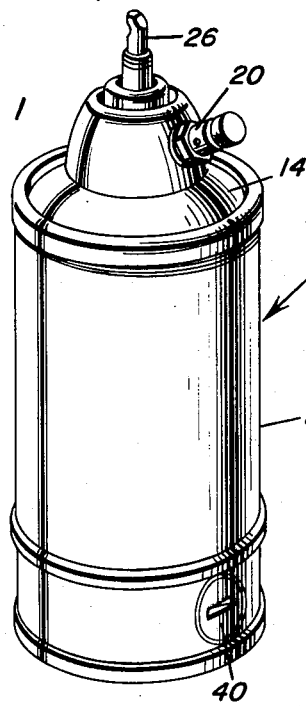
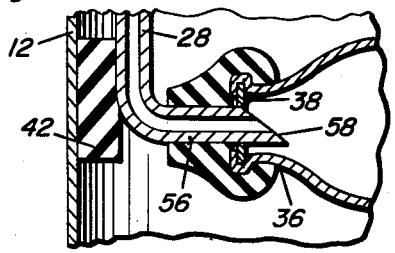
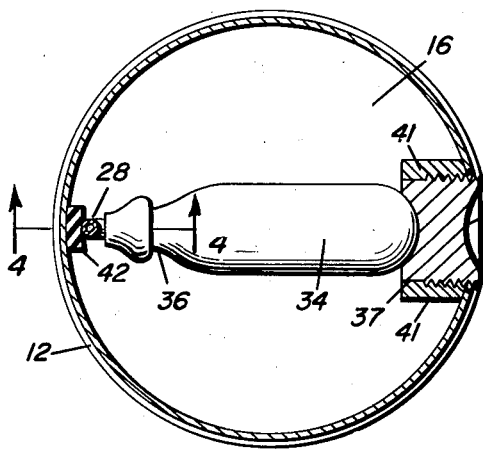
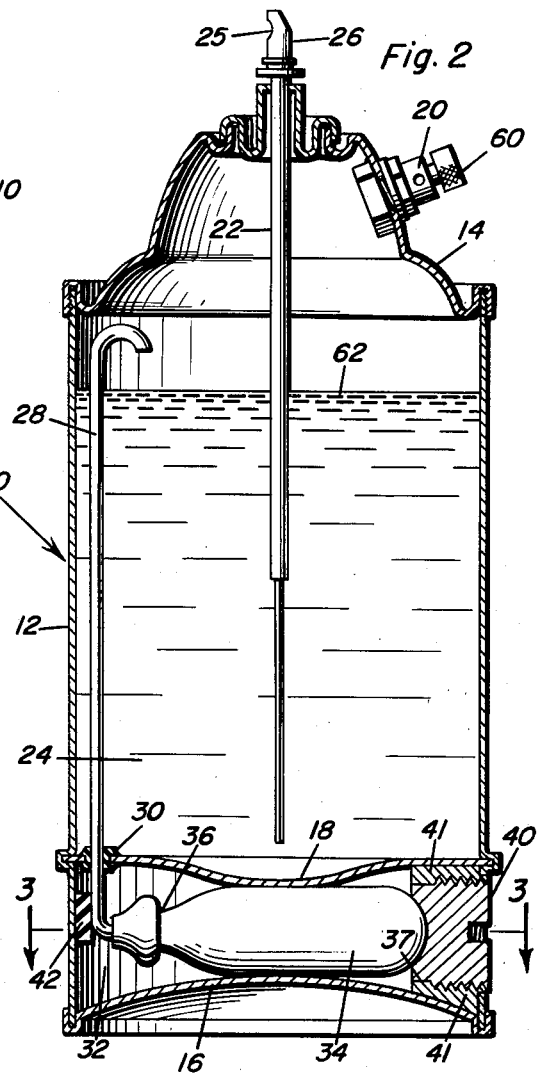
Dixie Beckworth
INVENTOR.

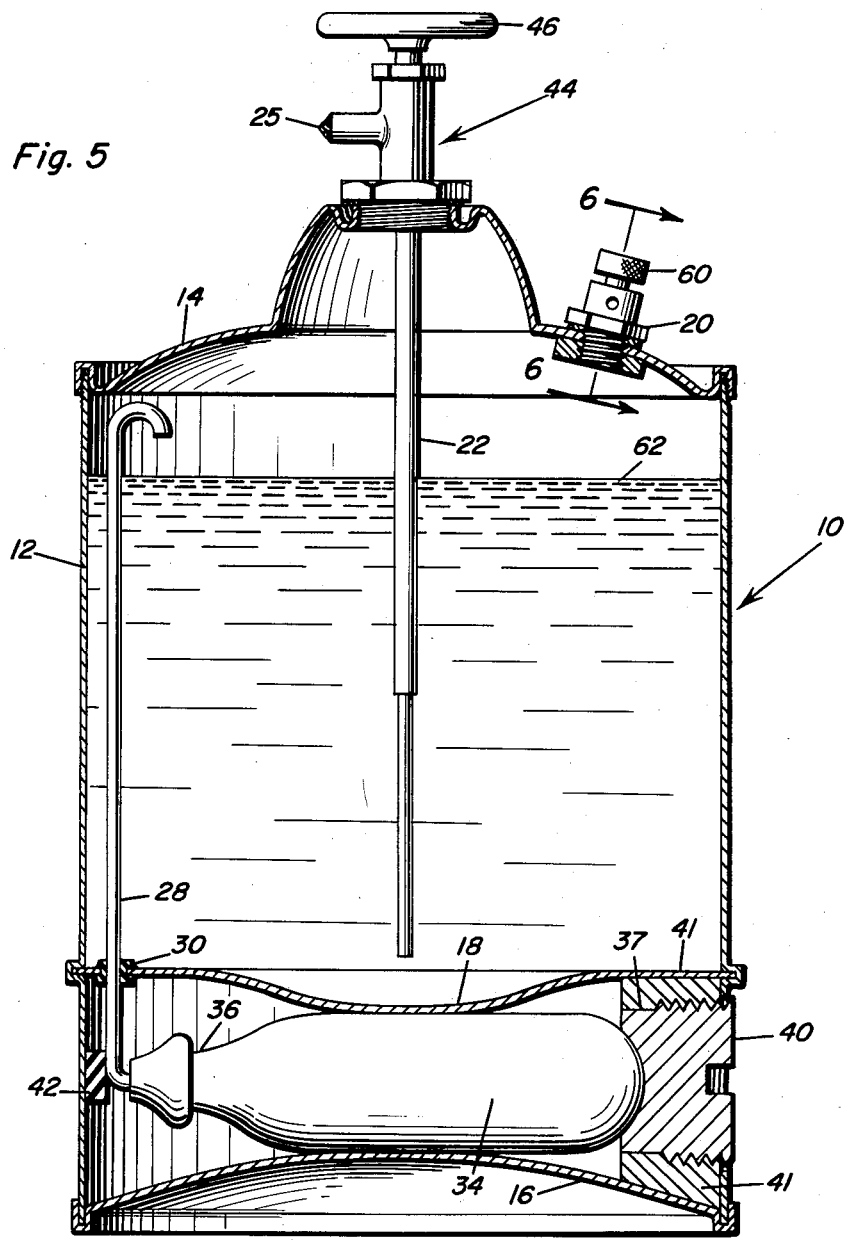
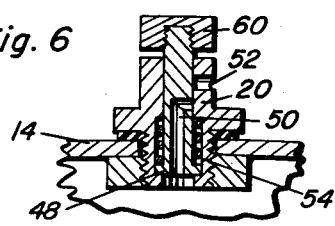

United States Patent Office 2,976,897
Patented Mar. 28, 1961

2,976,897
REUSABLE PRESSURIZED CANISTER

Dixie Beckworth, Portola Valley, Calif.
(987 Commercial Ave., Palo Alto, Calif.)

Filed Feb. 10, 1959, Ser. No. 792,337

11 Claims. (Cl. 141—17)

This invention comprises a novel and useful pressurized canister which is adapted to receive any suitable fluid to be sprayed such as an insecticide, paint, or other fluid, and more particularly to a pressurized canister which may be refilled and recharged so that it may be used more than once.

The primary object of this invention is to provide a pressurized canister which may be used to spray desired amounts of fluid and which may be refilled and used again after it has once been emptied.

A further object of this invention is to provide a pressurized canister which will make automatic applications of a desired amount of spray and which may be refilled and used again after it has once been emptied.

Another important object is to provide a pressurized canister for spraying liquids which may be refilled and used again without the use of special tools and with a high degree of safety.

Heretofore, pressurized canisters or bombs have not been of the reusable type. There have been some attempts to design the reusable type, but most have had drawbacks which made them unacceptable to the public as can be realized by the absence of any quantity of reusable canisters on the market at this time. Some of the drawbacks have been high cost of manufacture, low safety factors, canisters of irregular shape because of the addition of a pressure chamber, and others which have not been desirable to the public.

It is therefore a final object of this invention to provide a pressurized canister for the dispensing of a liquid by means of a spray which may be refilled, and which has a relatively low cost of manufacture, safety factors of high degree, and canisters which may be readily handled because of their simple cylindrical shape.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a suitable embodiment of the invention;

Figure 2 is a vertical sectional view of the invention;

Figure 3 is a horizontal sectional view taken substantially upon a plane indicated by the line 3—3 of Figure 2;

Figure 4 is an enlarged fragmentary sectional view of the invention showing the connection between the pressurized container and the pressure delivery tube;

Figure 5 is a vertical sectional view of a modification of the invention similar to Figure 2, but showing the use of a valve which may be retained in an open position; and Figure 6 is an enlarged fragmentary sectional view of the invention taken substantially upon the plane indicated by the line 6—6 of Figure 5 showing the details of the relief valve.

Referring now to the figures, the numeral 10 generally designates the canister comprising a cylindrical body 12, a top wall 14, an end wall 16, and a partition 18, and having a pressure release valve 20 mounted in its top wall 14. A delivery tube 22 extends from the bottom of the liquid receiving section 24, through the top wall 14, and terminates in a spray nozzle 25 at its upper end. A manually operated valve (not shown) is contained in the nozzle body 26.

A connecting conduit or tube 28 extends downwardly from the upper part of the fluid receiving section 24, through a sealing grommet 30 acting as a pressure seal in the partition 18, and into the pressure reservoir receiving section 32. The pressurized container 34 is inserted through the opening 36 which is slidingly received between the partition 18 and the end wall 16, and, as shown in Figure 4, the reduced end 36 of the container 34 is guided into contact with a horizontally extending end portion 56 of the pressure tube 28. The beveled end 58 pierces the frangible closure 38 on the reduced end of the container 34, upon rotation of the plug 40, which is threadingly engaged in bushing 41, and which embraces the larger end of the container 34 urging it into contact with tube 28. The beveled extremity 58 on the end portion 56 has a sharp blade or edge constituting a perforating tool. A suitable resilient member 42, which may be constructed of a resilient material such as plastic or rubber, is disposed between the side wall of the cylinder 12 and the pressure tube 28 acting as a stop for the tube as the closure 38 is opened by the beveled end of the tube as the container 34 is pressed upon it, and a resilient guiding and sealing member is carried by the end portion 56 and encloses the reduced end 36.

Referring now more specifically to Figure 5, the figure 44 generally designates a valve mechanism of the type which is opened and closed by means of a handwheel 46. Such a valve would enable the canister to be placed within an area to be sprayed with insecticide or the like, whereupon the valve 44 could be opened, and the canister could be then left to disperse the insecticide until either the pressure was exhausted, or until the supply of insecticide was depleted.

Except for the change in the dispensing valve, the embodiment of Figure 5 is identical with that of Figures 1-4 and the same numerals are used to designate identical elements.

As shown in Figure 6 the pressure relief valve comprises a plug 20 threadingly received in the top wall 14 with a spring loaded piston 48 disposed within the plug. A passageway 50 is formed within the piston 48 and is registrable with the opening 52 in the plug 20 upon the outward movement of the piston 48 against the compression spring 54 as an excess of internal pressure is applied against the piston, or by the outward movement of the hand knob 60. The valve of Figure 6 is employed in both forms of the invention hereinbefore disclosed.

In operation, the canister 10 is first filled with liquid 62 through the threaded opening after the relief valve 20 has been removed, the relief valve is then replaced and the pressure container 34 is then inserted through the opening 37 whereupon it is engaged with the sharp beveled end 58 of the tube 28 upon the replacement of the threaded plug 40. As the frangible closure 38 in the end of the container is ruptured by the end 58, the pressure is released from the container with the result that a pressure area is formed above the liquid 62 inside the container. Upon the opening of either type of valves, the liquid 62 within the container, now under pressure, will be forced up and into the delivery tube 22 and out into the air by means of the spray nozzle 25.

After being used, the canister 10 may be voided of any remaining liquid therein upon the removal of either the valve plug 20 or the threadedly engaged top wall 14. After the inside of the liquid receiving section 24 has been cleaned, a new charge of liquid may then be introduced thereinto and a fresh pressurized container inserted into the pressure reservoir receiving section 32 whereupon the canister 10 will again be ready for instant use.

It is to be understood that any convenient valve mechanism may be used to dispense the liquid from the container, and that such mechanism may be either permanently attached or removably secured to the top wall 14 as shown in Figure 5 so as to facilitate the replacement of the same, or the cleaning and filling of the liquid receiving section 24 of the canister 10. Further, the connecting conduit or tube 28, being of capillary proportions, maintains a pressure in the pressure reservoir 34 greater than the pressure above the liquid 62 in the liquid receiving section 24. The liquid 62 will therefore not flow backward through the connecting conduit 28 and into the pressure reservoir 34.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A reusable pressurized canister comprising a cylindrical body, top and bottom walls fixedly secured thereto, a partition spaced between said top and bottom walls forming an upper liquid receiving section and a lower pressure gas reservoir receiving section, said top wall having first and second openings therein, a delivery tube extending through said first opening and secured to said top wall, said tube extending downwardly in said upper section to a point slightly above said partition, a control valve secured to the top of said tube, said second opening affording passage of liquid therethrough, a closure for said second opening, a pressure release valve disposed in the said closure, means for opening the release valve from the exterior of the canister, a connecting conduit for conveying pressure from said pressure reservoir to the top portion of said upper section whereby said pressure will force any fluid in said canister downward and up through said delivery tube upon the opening of said valve.

2. The combination of claim 1, wherein said closure comprises a plug threadingly engaged in said second opening.

3. The combination of claim 1, wherein said connecting conduit comprises a tube of sufficiently restricted diameter to prevent the free flow of fluid therethrough, said tube extending upward from said pressure reservoir through said partition and terminating in the upper portion of said upper section above the level of liquid therein.

4. A reusable pressurized canister comprising a cylindrical shaped body, top and bottom walls fixedly secured thereto, a partition spaced between said top and bottom walls forming an upper liquid receiving section and a lower receiving section, a means for dispensing liquid from the bottom of said upper section through said top wall, a valve operable from the exterior of said body for controlling the flow of liquid through said dispensing means, a connecting conduit having one end opening into the said receiving section and another end opening into the top portion of said upper section, a container of liquefied gas disposed in the receiving section, means for driving the said one end of the connecting conduit in the receiving section into the container, and means sealing the said one end of the conduit to be in communication with the interior of the container of the liquefied gas as the conduit enters the container.

5. The combination of claim 4, wherein said container is disposed transversely in said lower section, said side wall having an opening communicating with said lower section and of sufficient size for passage of said container therethrough.

6. The combination of claim 5, wherein said bottom wall and said partition are convergent towards each other and embrace and support said container.

7. The combination of claim 6, wherein said connecting conduit comprises a tube of sufficiently restricted diameter to prevent the free flow of fluid therethrough, said tube extending upwards from said lower section through said partition terminating in the top portion of said upper section.

8. The combination of claim 7, including a closure plug for said side wall opening.

9. The combination of claim 8, including a stop member in said lower section engaging the connecting conduit adjacent the end in the receiving section, said closure plug engaging said container and clamping the latter and the connecting conduit against said stop member, and maintaining said conduit in communication with said container.

10. The combination of claim 4 including means securing said top wall to said body, means securing said delivery tube to said top wall, at least one of said means comprising a screw threaded engagement.

11. The combination of claim 1, including means securing said top wall to said body, means securing said delivery tube to said top wall, at least one of said means comprising a screw threaded engagement.

References Cited in the file of this patent

UNITED STATES PATENTS

| | | |
|---|---|---|
| 1,139,353 | Ellis | May 11, 1915 |
| 1,767,680 | Hutt | June 24, 1930 |
| 2,659,629 | Graham | Nov. 17, 1953 |
| 2,772,922 | Boyd et al. | Dec. 4, 1956 |